April 18, 1933.         R. P. WAGNER                1,904,180
                    CONNECTING ROD CONNECTION
                       Filed Jan. 8, 1929
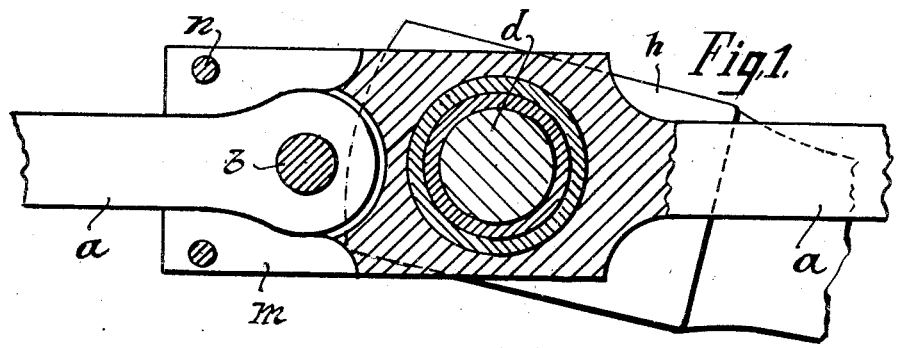
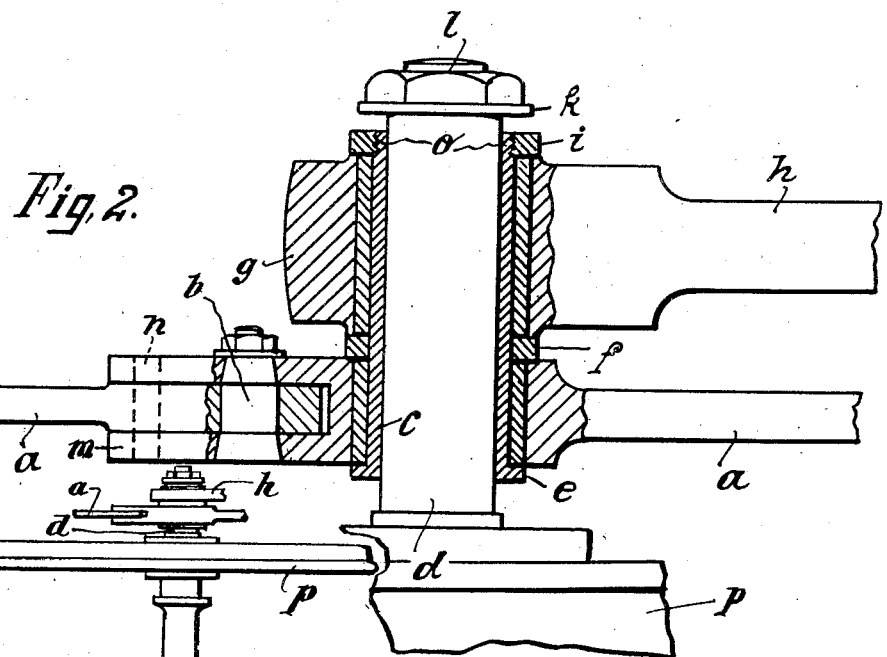
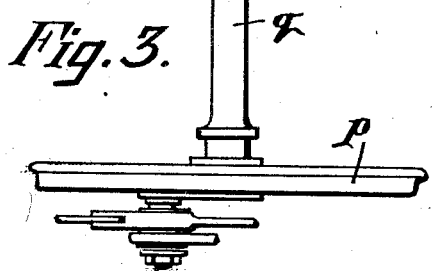

Patented Apr. 18, 1933

1,904,180

UNITED STATES PATENT OFFICE

RICHARD P. WAGNER, OF BERLIN, GERMANY

CONNECTING ROD CONNECTION

Application filed January 8, 1929, Serial No. 331,072, and in Germany January 12, 1928.

My invention relates to locomotive axles having side play, and more particularly to a connecting rod connection in combination with such axles. It is an object of my invention to so design the said connection that it may be applied to a driving axle of a locomotive.

To this end, I anchor the big end of the connecting rod against lateral play on the coupling rod while the pin is free to slide in the big end.

It has already been proposed to provide side play for the coupled axles of locomotives within and without the fixed wheel base but obviously this is not a perfectly satisfactory solution of the problem as the fixed axles will not adapt themselves to curves. This drawback is overcome in my invention by providing means permitting not only coupled, but also driving axles to be equipped for side play.

For any axle having side play the coupling rods must be so stiff as not to yield appreciably to lateral forces and it is obvious that in the present instance the same condition must be fulfilled.

In the accompanying drawing a pin of a driving wheel and parts of the connecting and coupling rods are illustrated by way of example.

In the drawing

Fig. 1 is a transverse section through the bush of the coupling rod,

Fig. 2 is a plan view, partly in section on the axis of the pin.

Fig. 3 is a plan view of a complete axle and wheels.

Referring now to the drawing, $a$ is a connecting rod having the usual pin $b$ to enable the rod to yield to the movements of the springs, $c$ is a bushing in the coupling rod, $d$ is the crank pin, which is secured in a wheel $p$ in the usual manner, $p, p$ being the wheels, and $q$ being the axle, $e$ is a flange at the inner end of the bushing $c$, said bushing extending into the connecting rod big end $g$, $f$ is a washer inserted between the coupling rod $a$ and the big end $g$, $i$ is a nut secured on the outer end of the bushing $c$ by a thread $o$, $k$ is washer on the end of the pin $g$, and $l$ is a nut for holding the washer $k$.

$m$ is fork formed on one of the coupling rod parts to surround the eye of the other part which is held on the pin $b$, and $n$ are stays in the fork arranged so far apart as not to interfere with the play of the parts.

The washer $f$ is fixed on the bushing $c$ so that the eye of the coupling rod $a$ and the big end $g$ are held on the bushing against axial displacement and so the big end $g$ is anchored to the coupling rod $a$ but the pin $d$ is free to slide in the bushing $c$ as the pin is longer than the bushing. The sliding movement is limited by the washer $k$ on the outer end of the pin $d$.

It will be understood that the side play of the driving axle is not interfered with by the rods while on the other hand the big end $g$ is held in line with the axis of the cylinder by being anchored on the coupling rod $a$.

I claim:

1. The combination of a crank pin, a main connecting rod, a side connecting rod, and means for mounting said rods on said crank pin for axial movement relative thereto, said means consisting of a sleeve slidably mounted on said crank pin and carrying said rods, a flange on one end of said sleeve for preventing movement of said rods in one direction, means for spacing said rods longitudinally on said sleeve, and means on said sleeve for preventing movement of said rods in the opposite direction.

2. The combination of a crank pin, a main connecting rod, a side connecting rod, and means for mounting said rods on said crank pin for axial movement relative thereto, said means consisting of a sleeve slidably mounted on said crank pin and carrying said rods, a flange on one end of said sleeve for preventing movement of said rods in one direction, and means on said sleeve for preventing movement of said rods in the opposite direction.

R. P. WAGNER.